(12) United States Patent
Frankenreiter

(10) Patent No.: US 11,814,233 B2
(45) Date of Patent: Nov. 14, 2023

(54) MICROWAVEABLE CONTAINER

(71) Applicant: Anthony M. Frankenreiter, St. Louis, MO (US)

(72) Inventor: Anthony M. Frankenreiter, St. Louis, MO (US)

( * ) Notice: Subject to any disclaimer, the term of this patent is extended or adjusted under 35 U.S.C. 154(b) by 0 days.

(21) Appl. No.: 17/372,809

(22) Filed: Jul. 12, 2021

(65) Prior Publication Data

US 2023/0010776 A1    Jan. 12, 2023

(51) Int. Cl.
| | |
|---|---|
| *B65D 81/34* | (2006.01) |
| *B65D 21/02* | (2006.01) |
| *A47J 36/02* | (2006.01) |
| *B65D 25/28* | (2006.01) |
| *A23L 5/10* | (2016.01) |
| *A47J 36/06* | (2006.01) |
| *A47J 27/13* | (2006.01) |

(52) U.S. Cl.
CPC ............ *B65D 81/3453* (2013.01); *A23L 5/15* (2016.08); *A47J 27/13* (2013.01); *A47J 36/027* (2013.01); *A47J 36/06* (2013.01); *B65D 21/0233* (2013.01); *B65D 25/2823* (2013.01)

(58) Field of Classification Search
CPC .............. B65D 1/3453; B65D 21/0233; B65D 25/2823; A23L 5/15; A47J 27/13; A47J 36/027; A47J 36/06
USPC ....... 220/781, 528, 526, 573.4, 23.87, 23.89
See application file for complete search history.

(56) References Cited

U.S. PATENT DOCUMENTS

| | | | | |
|---|---|---|---|---|
| 1,470,199 A | * | 10/1923 | Small | A47J 27/13 |
| | | | | 220/23.88 |
| 2,954,893 A | * | 10/1960 | Sayre | F25D 3/08 |
| | | | | 220/592.25 |
| 4,317,017 A | * | 2/1982 | Bowen | A47J 27/04 |
| | | | | 426/243 |
| 4,807,776 A | * | 2/1989 | Cortopassi | B65D 43/0212 |
| | | | | 220/528 |
| 5,011,013 A | | 4/1991 | Meisner et al. | |

(Continued)

FOREIGN PATENT DOCUMENTS

JP        H08280550 A    * 10/1996

OTHER PUBLICATIONS

RTIC Day Cooler Lunch Container, 2021 RTIC Outdoors LLC, https://rticoutdoors.com/Lunch-Container, downloaded Oct. 6, 2021, 2 pages.

*Primary Examiner* — J. Gregory Pickett
*Assistant Examiner* — Niki M Eloshway
(74) *Attorney, Agent, or Firm* — STINSON LLP

(57) ABSTRACT

A microwaveable container for holding food includes a first container, a second container and a lid. The first container has a lower food holding space sized and shaped to hold a first food and a second container receiving space disposed above the lower food holding space. The first container has a shoulder extending outward from the lower food holding space. The second container nests with the first container and has an upper food holding space sized and shaped to hold a second food. The second container is positionable in the second container receiving space of the first container such that the second container separates the first and second foods held in the respective lower and upper food holding spaces. The second container engages and rests on the shoulder of the first container when nested. The lid attaches directly to the first container.

10 Claims, 4 Drawing Sheets

(56) References Cited

U.S. PATENT DOCUMENTS

| | | | | |
|---|---|---|---|---|
| 5,031,519 | A | * | 7/1991 | Toida ........................ A47J 37/01 |
| | | | | 99/410 |
| 5,392,901 | A | * | 2/1995 | Kuray ........................ F42B 39/00 |
| | | | | 206/372 |
| 5,575,401 | A | | 11/1996 | Trower et al. |
| 5,632,403 | A | * | 5/1997 | Deng ........................ A47J 27/08 |
| | | | | 220/592.2 |
| 5,756,976 | A | * | 5/1998 | Akasaka ................ A47J 36/027 |
| | | | | 219/762 |
| 6,761,366 | B1 | | 7/2004 | Klemmensen et al. |
| 8,006,839 | B2 | | 8/2011 | Hafner |
| 8,226,999 | B2 | | 7/2012 | Roberts et al. |
| 10,889,421 | B2 | | 1/2021 | Kaplan et al. |
| 2005/0035017 | A1 | | 2/2005 | Jaron et al. |
| 2006/0191934 | A1 | | 8/2006 | Kreisman et al. |
| 2008/0061060 | A1 | * | 3/2008 | Aubrey ..................... B65D 25/10 |
| | | | | 220/23.87 |
| 2020/0172290 | A1 | | 6/2020 | Serrahima et al. |
| 2020/0172292 | A1 | | 6/2020 | Serrahima et al. |

\* cited by examiner

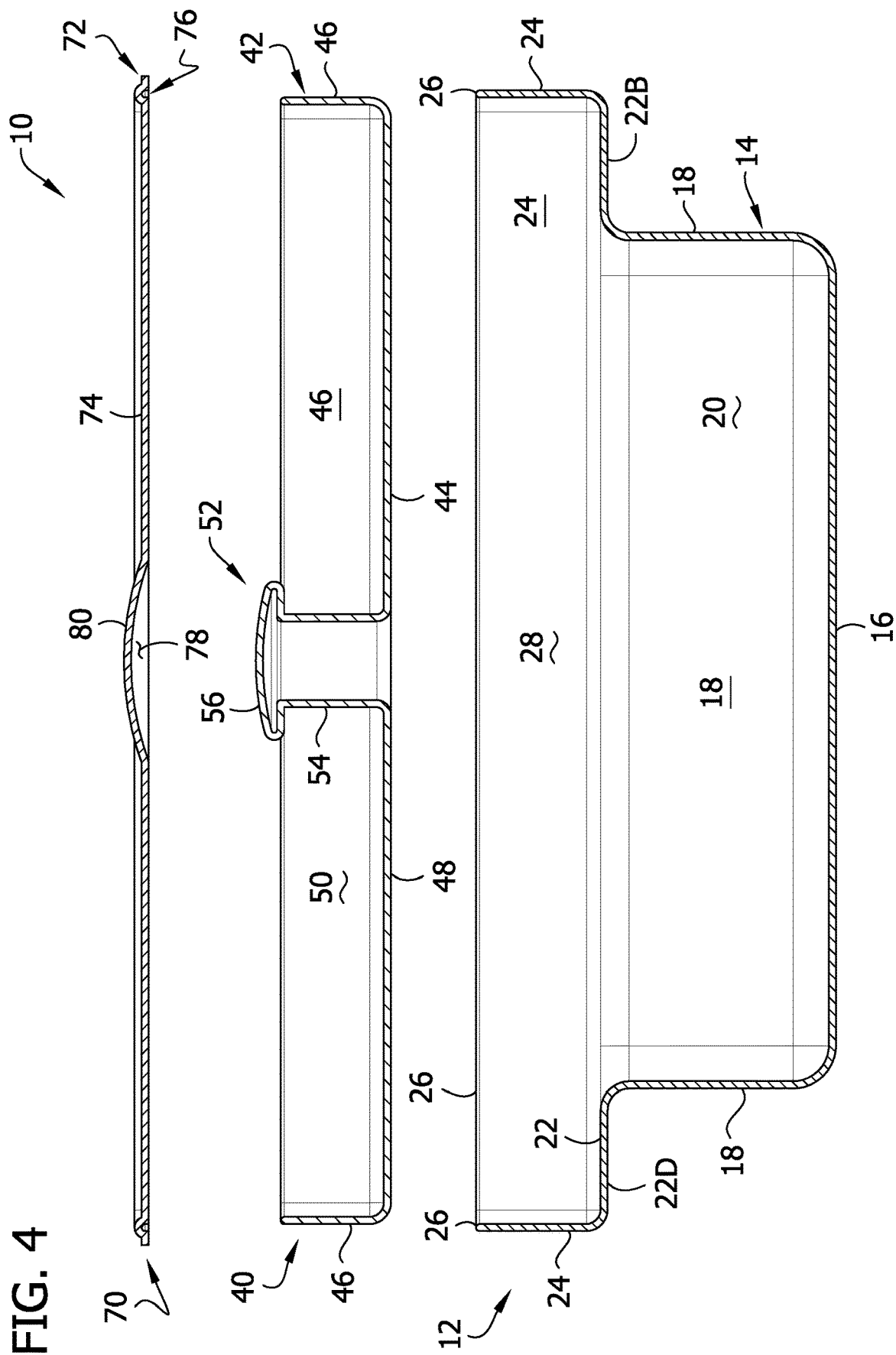

MICROWAVEABLE CONTAINER

FIELD

The present disclosure generally relates to a food storage, and more particularly to a microwaveable container for storing food.

BACKGROUND

Food containers are used to store and/or transport food. Frequently, if a user desires the food in the food container to be hot when consumed, the food in the food container is heated or re-heated in a microwave.

SUMMARY

In one aspect, a microwaveable container for holding food comprises a first container having a first container body. The first container body defines a lower food holding space sized and shaped to hold a first food and a second container receiving space disposed above the lower food holding space. The first container body includes a shoulder extending outward from the lower food holding space at an upper end of the lower food holding space. The shoulder of the first container body defines a bottom of the second container receiving space. A second container is configured to nest with the first container. The second container has a second container body defining an upper food holding space sized and shaped to hold a second food. The second container body is sized and shaped to be positioned in the second container receiving space of the first container such that the second container body separates the first food held in the lower food holding space from the second food held in the upper food holding space. The second container body is configured to engage and rest on the shoulder of the first container body when the second container is nested with the first container. A lid is configured to be attached directly to the first container.

In another aspect, a method of using a microwaveable container comprises placing a first food in a lower food holding space of a first container; placing a second food in an upper food holding space of a second container; and nesting the second container with the first container. The nesting includes positioning the second container in a second container receiving space of the first container by placing the second container on a shoulder of the first container. The shoulder extends outward from an upper end of the lower food holding space. The method may further include attaching a lid to the first container after the second container is nested with the first container thereby securing the second container in the second container receiving space.

Other objects and features of the present disclosure will be in part apparent and in part pointed out hereinafter.

BRIEF DESCRIPTION OF THE DRAWINGS

FIG. 4 is an exploded cross-sectional view of the microwaveable container.

Corresponding reference characters indicate corresponding parts throughout the drawings.

DETAILED DESCRIPTION

Figure 1:
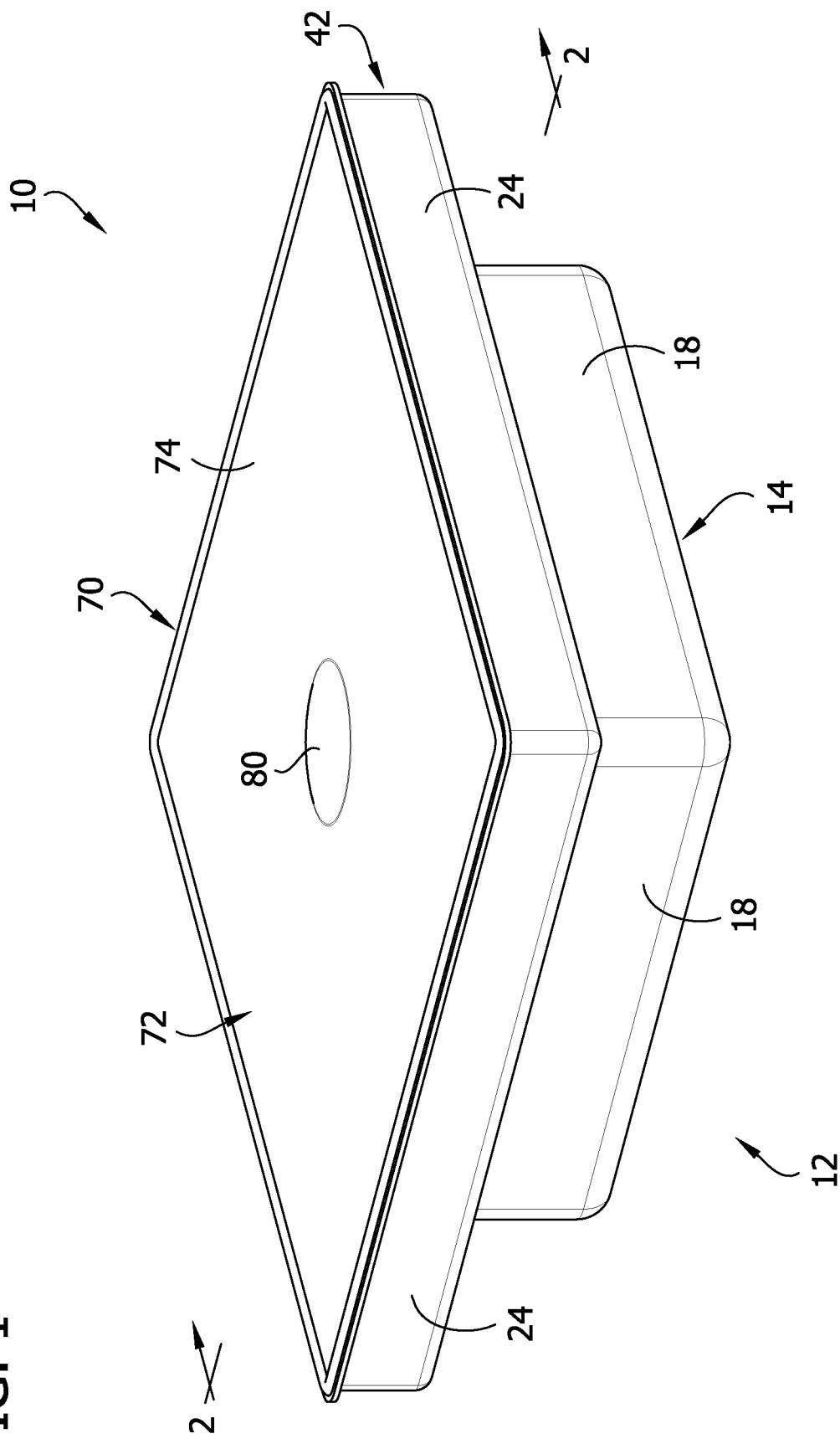
FIG. 1 is a perspective of a microwaveable container according to one embodiment of the present disclosure.

The present disclosure relates to a portable container for holding one or more types of food. The container is microwaveable, enabling the container to be placed in a microwave (not shown) for heating or re-heating the food contained in the container. The microwaveable container includes multiple nestable containers or trays for holding different types of food and keeping the food in each container separate from the food held by other containers.

Referring to FIGS. 1-4, a microwaveable container (e.g., a microwaveable container assembly) for holding food (not shown) according to one embodiment of the present disclosure is generally indicated at 10. The microwaveable container 10 includes two or more nestable containers or trays. In the illustrated embodiment, the microwaveable container 10 includes a first container or tray 12 and a second tray or container or tray 40, although additional containers or trays (e.g., a third container, a fourth container, etc.) are within the scope of the present disclosure. The microwaveable container 10 also includes a lid 70 for closing the microwaveable container.

The first container 12 has a first container body 14 for holding food (e.g., a first food). The first container body 14 includes a bottom wall 16 and lower side walls 18. The lower side walls 18 are interconnected and extend generally upward from the bottom wall 16 (e.g., from the side edge margins thereof). In the illustrated embodiment, the bottom wall 16 and lower side walls 18 are generally planar. The bottom wall 16 and the lower side walls 18 of the first container body 14 define a first or lower food holding space 20 of the first container 12. The lower food holding space 20 is sized and shaped to hold a first food. The lower food holding space 20 has closed bottom and sides and an open top or upper end. The first container body 14 also includes a perimeter or generally circumferential shoulder 22. The shoulder 22 extends generally outward (e.g., radially outward) from the lower food holding space 20 at the upper end or open top of the lower food holding space. The shoulder 22 is connected to and extend from the upper edges of the lower side walls 18. In the illustrated embodiment in which the first container body 14 is generally rectangular, the shoulder 22 includes four interconnected shoulder flanges 22A-D. Each shoulder flange 22A-D is connected to and extends outward from the upper edge of one of the lower side walls 18. The shoulder 22 is generally planar. Accordingly, each shoulder flange 22A-D is generally planar and are generally coplanar with one another. The shoulder 22 extends generally parallel to the bottom wall 16 and generally perpendicular to the lower sides walls 18.

The first container body 14 includes upper side walls 24 that are interconnected and extend generally upward from the shoulder 22 (e.g., from the outer edge margins thereof). The upper side walls 24 are generally planar and include free upper edges 26. The shoulder 22 and upper side walls 24 of the first container body 14 define a second container receiving space 28 of the first container 12. The second container receiving space 28 is sized and shaped to receive the second container 40. The second container receiving space 28 is disposed above (e.g., directly above) the lower food holding space 20. The shoulder 22 of the first container body 14 defines a bottom of the second container receiving space 28. An imaginary plane defined by the shoulder 22 generally separates the lower food holding space 20 (e.g., the open top thereof) and second container receiving space 28 (e.g., the open bottom thereof). The free upper edges 26 of the upper side walls 24 define an open top or upper end of the second container receiving space 28 (broadly, an opening of the first container body 14). Thus, food can be placed in the lower food holding space 20 by passing the food through the open upper end of the second container receiving space 28 and into the lower food holding space. Likewise, the second container 40 can be placed or nested with the first container 12 by passing the second container through the open upper end of the second container receiving space 28 and onto the shoulder 22.

The second container 40 has a second container body 42 for holding food (e.g., a second food). The second container body 42 includes a bottom wall 44 and side walls 46. The side walls 46 are interconnected and extend generally upward from the bottom wall 44 (e.g., from the side edge margins thereof). The bottom wall 44 and the side walls 46 are generally planar. The bottom wall 44 has bottom surface 48, which is also generally planar. The bottom wall 44 and the side walls 46 of the second container body 42 define a second or upper food holding space 50. The upper food holding space 50 is sized and shaped to hold a second food.

The second container 40 is configured to nest with the first container 12. The second container body 42 of the second container 40 is sized and shaped to be positioned in the second container receiving space 28 of the first container 12. When the second container 40 is disposed in the second container receiving space 28, the second container body 42 (specifically, the bottom wall 44) separates any food held in the lower food holding space 20 of the first container 12 from any food held in the upper food holding space 50 of the second container. This keeps the food in the upper and lower food holding spaces 20, 50 separate and prevents the food from mixing.

Figure 2:
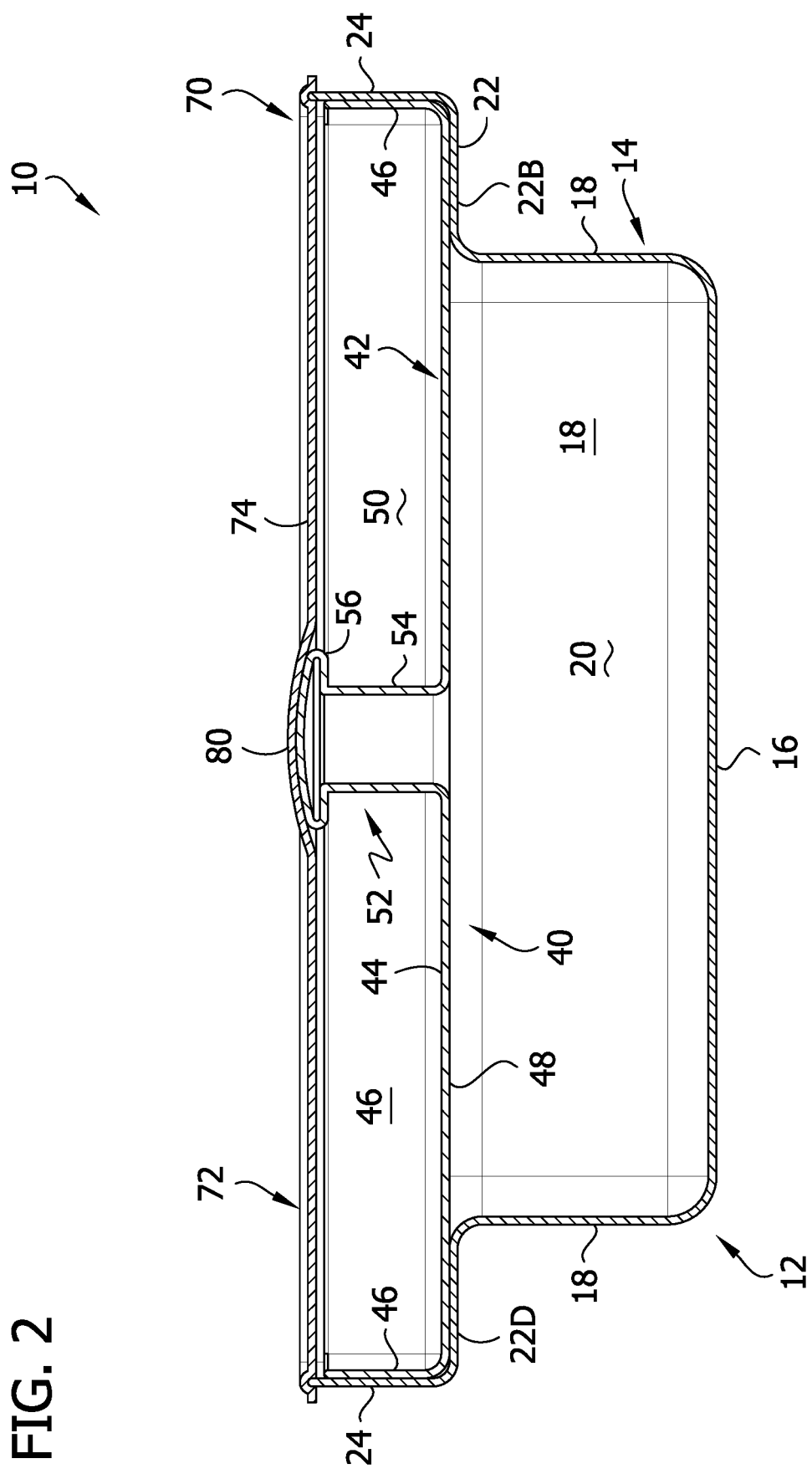
FIG. 2 is a cross-section of the microwaveable container taken through line 2-2 of FIG. 1.
Figure 3:
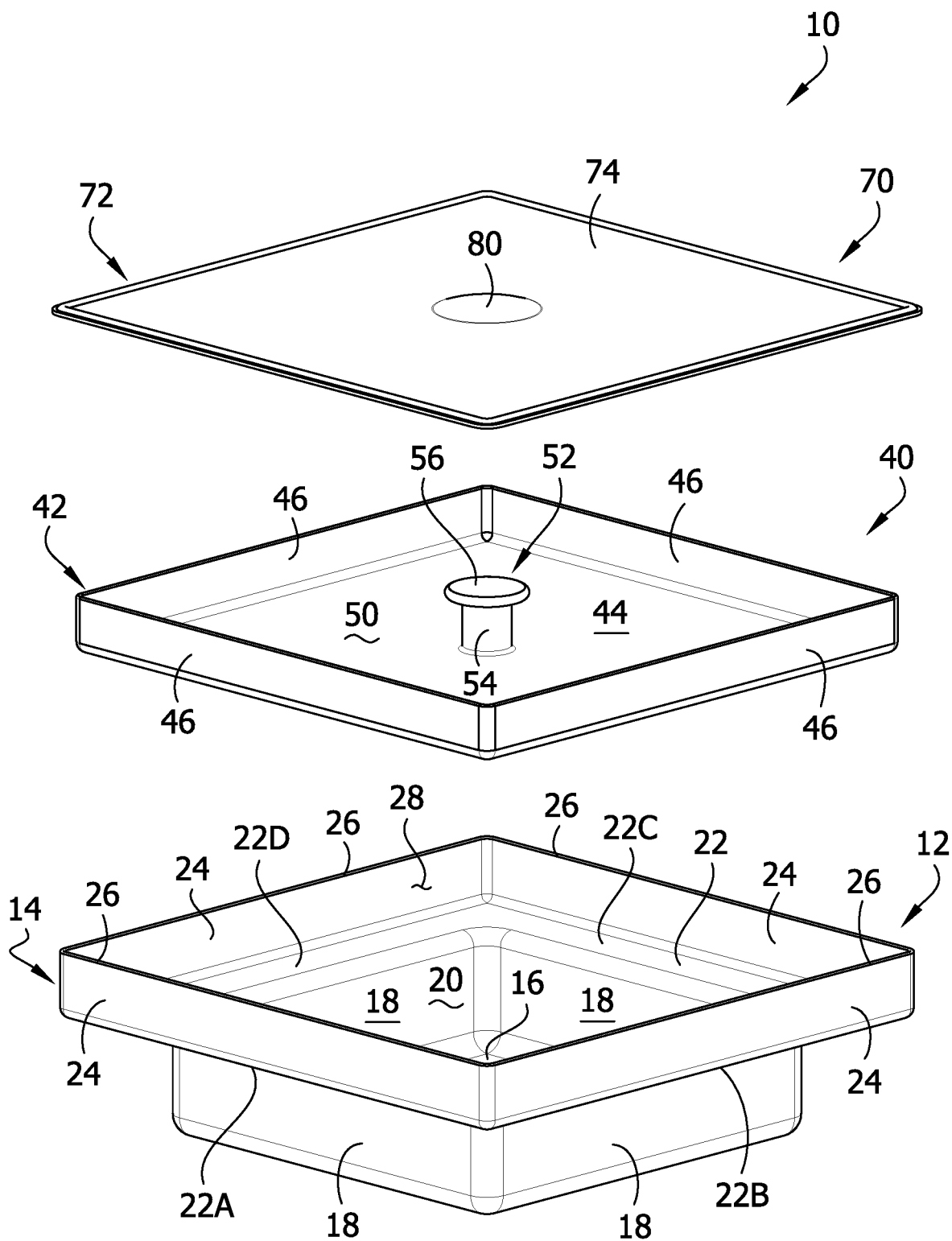
FIG. 3 is an exploded view of the microwaveable container.

The second container body 42 is configured to engage and rest on the shoulder 22 of the first container body 14 when the second container 40 is nested with the first container 12. The dimensions of the second container body 42 generally correspond to the dimensions of the second container receiving space 28. For example, the length and width of the second container body 42 generally corresponds to the length and width of the second container receiving space 28. This helps prevent the second container 40 from moving within the first container 12. As shown in FIG. 2, when the second container 40 is nested with the first container 12 (e.g., disposed in the second container receiving space 28), the bottom surface 48 of the bottom wall 44 of the second container body 42 engages and rests on the shoulder 22 (e.g., an upper surface thereof). In this position, the bottom surface 48 also overlies the lower food holding space 20, thereby closing the lower food holding space to keep any food container in the lower food holding space contained therein. As illustrated in FIG. 2, when the second container 40 is nested with the first container 12, the second container is not disposed in the lower food holding space 20 of the first container. This maximizes the available space of the lower food holding space 20 to hold food and establishes the shoulder 22 at the upper end of the lower food holding space as a visual indicator (e.g., a fill indicator) of how much food can be placed within the lower food holding space. Because the shoulder 22 is cantilevered outward of the lower side walls 18, the shoulder (alone or in combination with the upper side walls 24 or lid 70 when the microwaveable container is assembled) forms a handle or hold a user can easily grasp to move the first container 12 and, when assembled, the entire microwaveable container 10.

The second container 40 comprises a handle 52. In the illustrated embodiment, the handle 52 extends generally upward from a generally central location on the second container body 42. Specifically, the handle 52 extends upward from the center of the bottom wall 44. The handle 52 includes a support or post 54 and a knob or handhold 56 at the upper end of the handle. The post 54 is connected to and extends generally vertically from bottom wall 44 and the knob 56 is at the top of the post. The knob 56 and post 54 have generally circular cross-sectional shapes. Handle 52 is configured to be engaged by a user in order to lift the second container 40 out of the second container receiving space 28 of the first container 12 and/or lower the second container into the second container receiving space. Preferably, at least a portion of the handle 52 (e.g., the knob 56) is disposed at a vertical position that is above a vertical position of the upper end of the side walls 46. This ensures that a portion of the handle 52 will always be accessible to the user, even when the upper food holding space 50 is filled with food. Other configurations and arrangements of the handle are within the scope of the present disclosure. For example, the second container could include two or more handles.

Although in the illustrated embodiment, the first and second containers 12, 40 or tray bodies 14, 42 and the assembled microwaveable container 10 are generally rectangular, other sizes, configurations and shapes are within the scope of the present disclosure. For example, the first and second container or tray bodies may instead be generally round or oval, such that the lower sidewalls 18 and the upper sidewalls 24 of the first container body 14 and the side walls 46 of the second container body 42 need not be generally planar. Further, the first and second container bodies 14, 42 can each include one or more partitions (not shown) in the respective first and second food holding spaces 20, 50 to form sub-spaces in the respective first and second food holding spaces that receive and separate food in each holding space.

The lid 70 of the microwaveable container 10 is configured to be directly attached to the first container 12. The height of the second container body 42 (e.g., a side wall height of the side walls 46) is less than a height of the upper side walls 24 of the first container body 14. This permits the lid 70 to be attached to the first container 12. The lid 70 includes a lid body 72. The lid body 72 has a generally planar wall or cover 74. The lid body 72 is configured to form an interference fit with the first container body 14 to attach the lid 70 to the first container 12. The wall 74 of the lid body 72 defines a perimeter or circumferential channel 76 sized and shaped to receive and form the interference fit with the upper edge margin of the first container body 14 (e.g., the upper side walls 24) to attach the lid 70 to the first container 12. The perimeter channel 76 extends along the entire perimeter of the wall 74 of the lid body 72. To attach the lid 70 to the first container 12, the perimeter channel 76 is aligned with the upper edge margin of the first container body 14 and then pushed down onto the first container 12, thereby moving the perimeter channel into engagement with the upper edge margin in an interference fit. To remove the lid 70 from the first container 12, the lid body 72 is lifted up from the first container 12, thereby removing the upper edge margin of the first container body 14 from the perimeter channel 76.

In the illustrated embodiment, the wall 74 of the lid body 72 defines a handle receiving space 78. The wall 74 of the lid body 72 includes an indent 80 that defines the handle receiving space 78. The handle receiving space 78 is sized and shaped to receive a portion of the handle 52 when the second container 40 is nested with the first container 12 and the lid 70 is attached to the first container. The handle receiving space 78 is sized and shaped to receive the upper end portion of the knob 56 (broadly, at least a portion of the knob).

The lid 70 secures the second container 40 in the second container receiving space 28 of the first container 12 when the second container is nested with the first container and the lid is attached to the first container. When the lid 70 is attached to the first container 12, the lid blocks the upper end of the second container receiving space 28 (and the upper end of the upper food holding space 50) to secure the second container 40 in the first container. Preferably, the wall 74 of the lid body 72 engages the handle 52 when the second container 40 is nested with the first container 12 and the lid 70 is attached to the first container to prevent the second container from moving vertically within the second container receiving space 28. This also results in the lid 70 pushing and holding the second container 40 against the shoulder 22 of the first container body 14, which blocks the upper end of the lower food holding space 20 to help keep food in the lower food holding space.

In one embodiment, the first container 12, the second container 40 and the lid 70 are each integrally formed as a one-piece component. In other embodiments, each of the first container 12, the second container 40 and the lid 40 may be formed from multiple components secured together. In one embodiment, the first container 12, the second container 40 and/or the lid 70 are made out of flexible materials. A flexible lid 70 assists in attaching the lid to and removing the lid from the first container 12 when engaging and disengaging the interference fit formed between the perimeter channel 76 and the upper edge margin of the first container body 14. The first container 12, the second container 40 and/or the lid 70 are preferably made out of a microwaveable safe material, such as glass, Pyrex®, ceramic, porcelain, stoneware, plastics such as polypropylene and high-density polyethylene, and the like. This allows the user to place the any part of the microwaveable container 10 into the microwave with the food to be heated, thus preventing the user from having to transfer to the food from the container to a microwaveable safe dish, plate, or bowl. It is understood that the microwaveable container 10 can hold generally any kind of food, not just food to be heated in a microwave. For example, the lower food holding space 20 of the first container 12 can hold a salad to be consumed at room or cooler temperature and the upper food holding space 50 of the second container 40 can hold a pasta to be re-heated in a microwave in order to be consumed at a hot temperature.

In one exemplary manner of using the microwaveable container 10 described herein a user places a first food in the lower food holding space 20 of the first container 12 and places a second food in the upper food holding space 50 of the second container 40. The user may use the shoulder 22 of the first container 12 as a fill indicator to make sure the lower food holding space 20 is not overfilled with the first food. In other words, the user does not fill the lower food holding space 20 with food above the shoulder 22. The second container 40 is then nested with the first container 12. The user grabs the handle 52 and positions the second container 40 in the second container receiving space 28 of the first container 12 by placing the second container on the shoulder 22 of the first container. In some embodiments, the user may place the second food in the upper food holding space 50 after the second container 40 is nested with the first container. After the second container 40 is nested with the first container 12, the user then attaches the lid 70 to the first container 12. The container 10 is now closed and the user can transport the container to move the food container therein to a desired location, such as a workplace. To access the food within the container 10, the user removes the lid 70 from the first container 12. The user can then separate the first and second containers 12, 40 by grabbing the handle 52 and lifting the second container 40 out of the first container (e.g., the second container receiving space 28). If needed, the user can then place the first container 12 and the food held therein and/or the second container and the food held therein in a microwave to microwave the respective foods.

While the container 10 disclosed herein is described as carrying food, it is understood the container can be used to carry other items as well.

The foregoing descriptions of specific embodiments of the present disclosure are presented for purposes of illustration and description. They are not intended to be exhaustive or to limit the disclosure to the precise forms disclosed, and obviously many modifications and variations are possible in light of the above teaching. The exemplary embodiments were chosen and described to explain the principles of the disclosure and example practical applications, to thereby enable others skilled in the art to best utilize the disclosure and various embodiments with various modifications as are suited to the particular use contemplated.

It will be appreciated that various aspects of the disclosure described herein can be modified without departing from the scope of the appended claims. For example, features may be omitted or have other forms without departing from the scope of the present disclosure.

When introducing elements of the present disclosure or the preferred embodiment(s) thereof, the articles "a", "an", "the", and "said" are intended to mean that there are one or more of the elements. The terms "comprising", "including", and "having" are intended to be inclusive and mean that there may be additional elements other than the listed elements.

As various changes could be made in the above constructions, products, and methods without departing from the scope of the disclosure, it is intended that all matter contained in the above description and shown in the accompanying drawings shall be interpreted as illustrative and not in a limiting sense.

What is claimed is:

1. A microwaveable container for holding food comprising:
 a first container having a first container body, the first container body defining a lower food holding space sized and shaped to hold a first food and a second container receiving space disposed above the lower food holding space, the first container body including a shoulder extending outward from the lower food holding space at an upper end of the lower food holding space, a top of the lower food holding space being coplanar with the shoulder, the shoulder of the first container body defining a bottom of the second container receiving space;
 a second container configured to nest with the first container, the second container having a second container body defining an upper food holding space sized and shaped to hold a second food, the second container body sized and shaped to be positioned in the second container receiving space of the first container such that the second container body separates the first food held in the lower food holding space from the second food held in the upper food holding space, the second container body having a generally planar solid bottom wall free of apertures and configured to engage and rest on the shoulder of the first container body and overly the lower food holding space such that the second container is not disposed in the lower food holding space of the first container when the second container is nested with the first container, the second container comprising a handle extending upward from a generally central location on the second container body; and a lid configured to be attached directly to the first container and comprising a lid body defining a handle receiving space sized and shaped to receive a portion of the handle when the second container is nested with the first container and the lid is attached to the first container.

2. The microwaveable container of claim 1, wherein the handle includes a knob at the upper end of the handle, the handle receiving space sized and shaped to receive at least a portion of the knob.

3. The microwaveable container of claim 1, wherein the lid secures the second container in the second container receiving space when the second container is nested with the first container and the lid is attached to the first container.

4. The microwaveable container of claim 1, wherein the lid includes a lid body configured to form an interference fit with the first container body to attach the lid to the first container.

5. The microwaveable container of claim 4, wherein the lid body defines a perimeter channel sized and shaped to receive and form the interference fit with an upper perimeter edge margin of the first container body to attach the lid to the first container.

6. The microwaveable container of claim 1, wherein the first container and the second container are made out of a microwaveable safe material selected from the group consisting of glass, Pyrex, ceramic, porcelain, stoneware, plastics such as polypropylene and high-density polyethylene.

7. The microwaveable container of claim 1, wherein the first container body includes a bottom wall and lower side walls extending generally upward from the bottom wall, the bottom wall and lower side walls defining the lower food holding space.

8. The microwaveable container of claim 7, wherein the shoulder of the first container body extends outward from upper edges of the lower side walls, the first container body including upper side walls extending generally upward from the shoulder, the shoulder and upper side walls defining the second container receiving space.

9. The microwaveable container of claim 8, wherein the second container body includes the generally planar solid bottom wall and side walls extending generally upward from the bottom wall, the bottom wall and side walls of the second container body defining the second food holding space.

10. The microwaveable container of claim 9, wherein the side walls of the second container body have a side wall height that is less than a height of the upper side walls of the first container body.

* * * * *